Nov. 10, 1942.     A. C. SHUART ET AL     2,301,466
REFRIGERATOR
Filed April 8, 1937     5 Sheets-Sheet 1

INVENTORS
Arthur C. Shuart
Harry L. Axford
BY
E. M. Fenander   their
ATTORNEY.

Nov. 10, 1942.  A. C. SHUART ET AL  2,301,466
REFRIGERATOR
Filed April 8, 1937  5 Sheets-Sheet 2
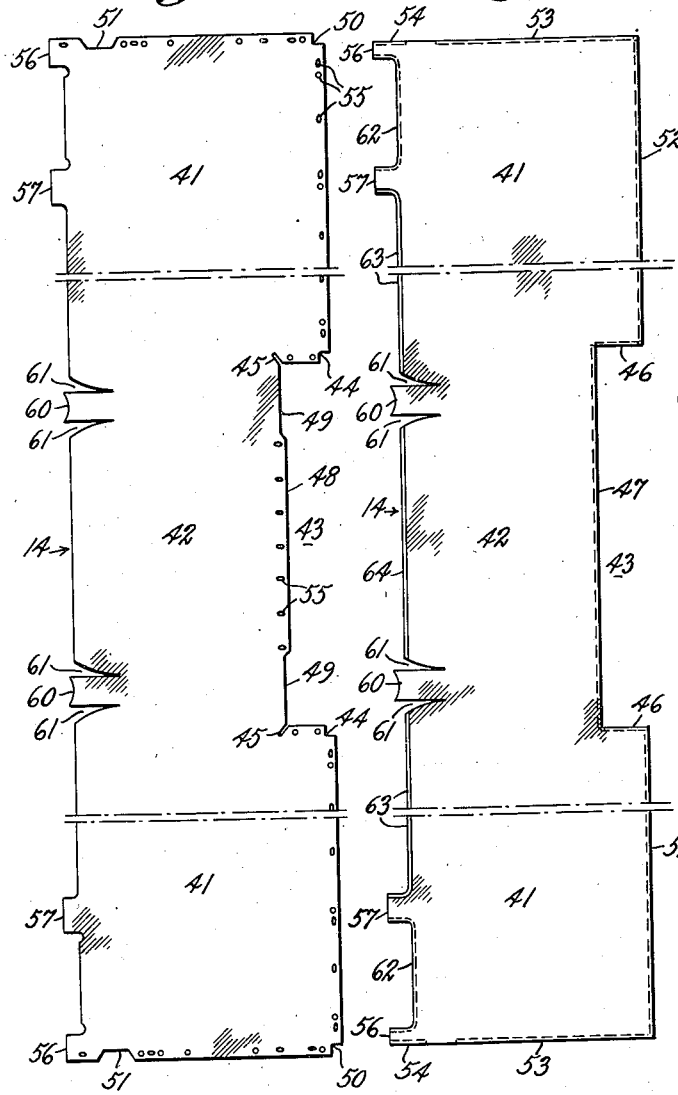
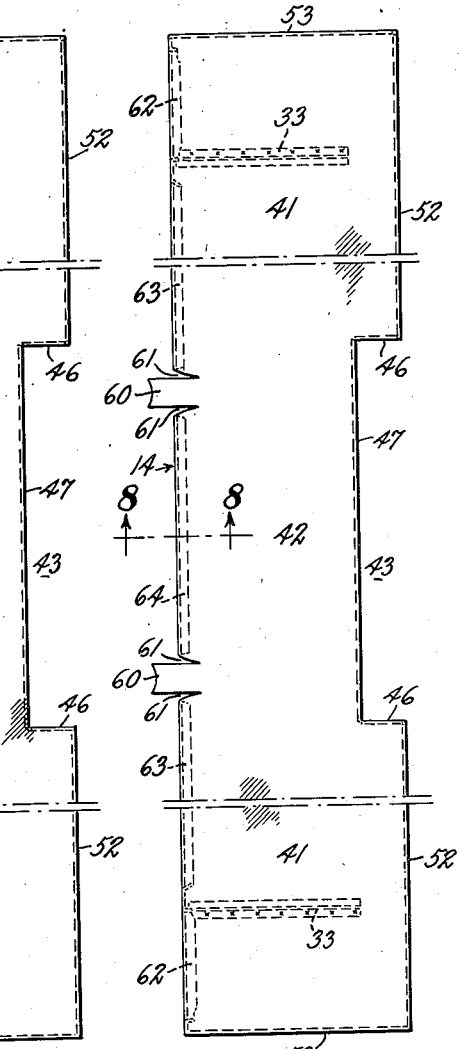
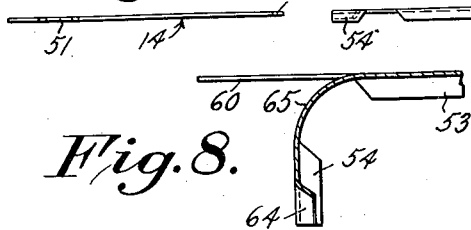
INVENTORS
Arthur C. Shuart
Harry L. Axford
BY
Ed Fenander their
ATTORNEY.

Nov. 10, 1942.　　A. C. SHUART ET AL　　2,301,466
REFRIGERATOR
Filed April 8, 1937　　5 Sheets-Sheet 3
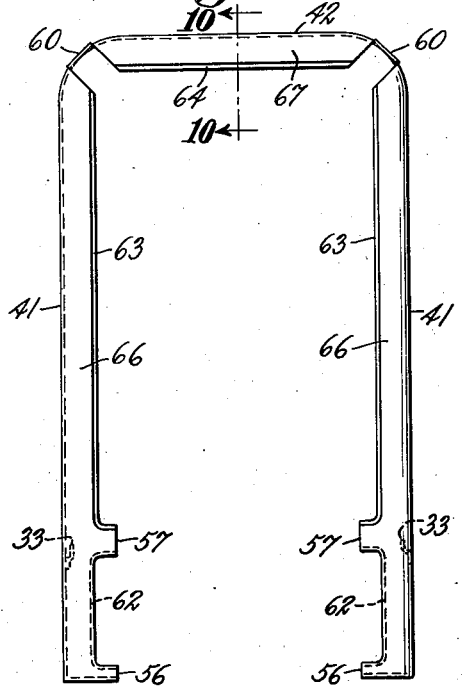
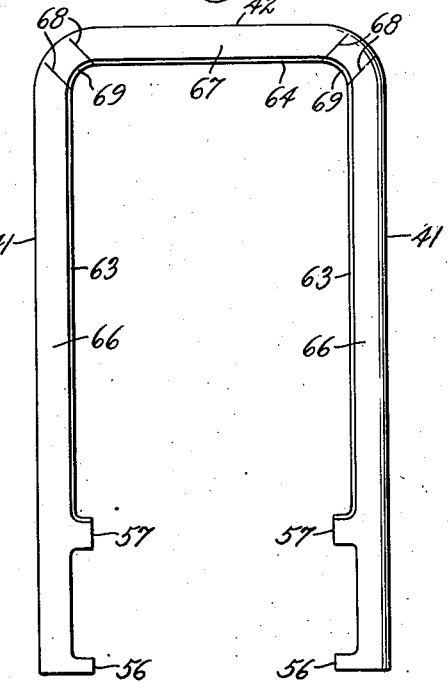
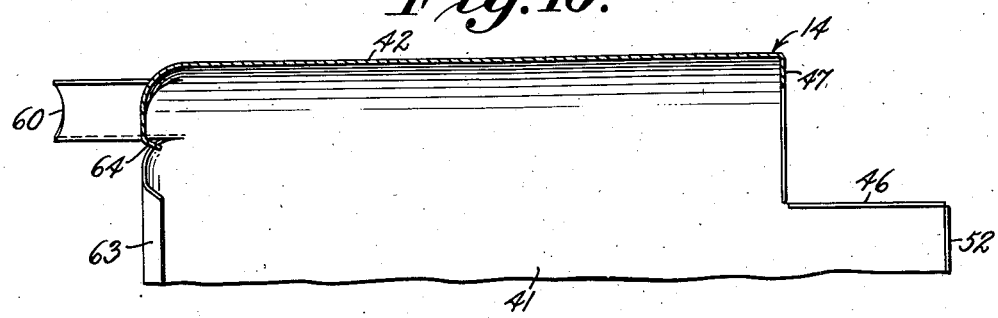
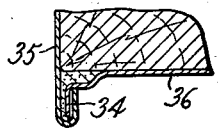
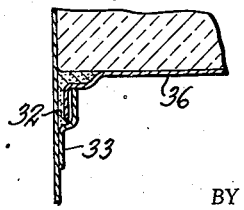
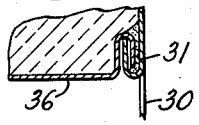
INVENTORS
Arthur C. Shuart
Harry L. Axford
BY
E. A. Fenander their
ATTORNEY.

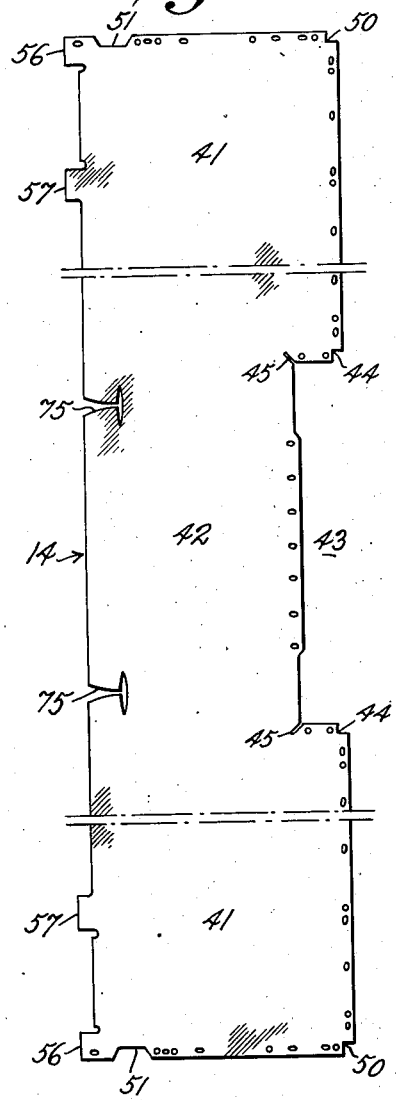
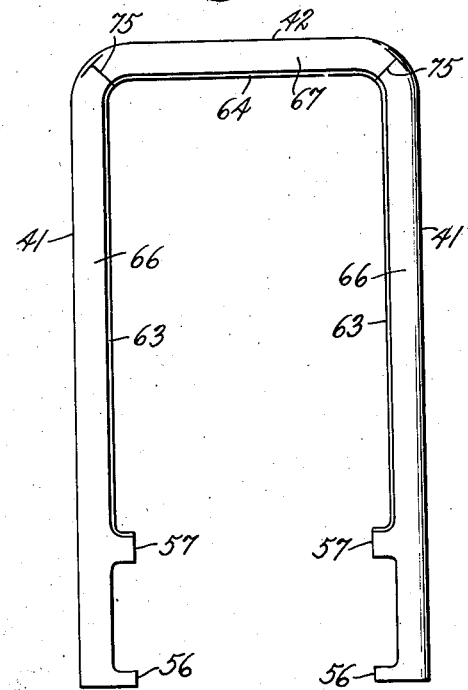

Patented Nov. 10, 1942

2,301,466

UNITED STATES PATENT OFFICE 2,301,466

REFRIGERATOR

Arthur C. Shuart, Rockford, Ill., and Harry L. Axford, Evansville, Ind., assignors to Servel, Inc., New York, N. Y., a corporation of Delaware Application April 8, 1937, Serial No. 135,629

3 Claims. (Cl. 220—9)

This invention relates to refrigerators, and more particularly to refrigerator cabinet structure.

It is an object of the invention to provide an improvement in refrigerator cabinets having an outer shell formed from a single sheet of metal, whereby a cabinet is provided having a marked improvement in appearance. Another object of the invention is to provide an improvement in fabricating a shell from a single sheet of metal by providing rounded corners about the entire front and at the top of the shell. A further object of the invention is to provide a cabinet having an outer shell of this type whereby the insulating material and inner liner defining the storage space may be inserted within the outer shell through the front of the cabinet to facilitate the assembly of the structure.

Figure 1:
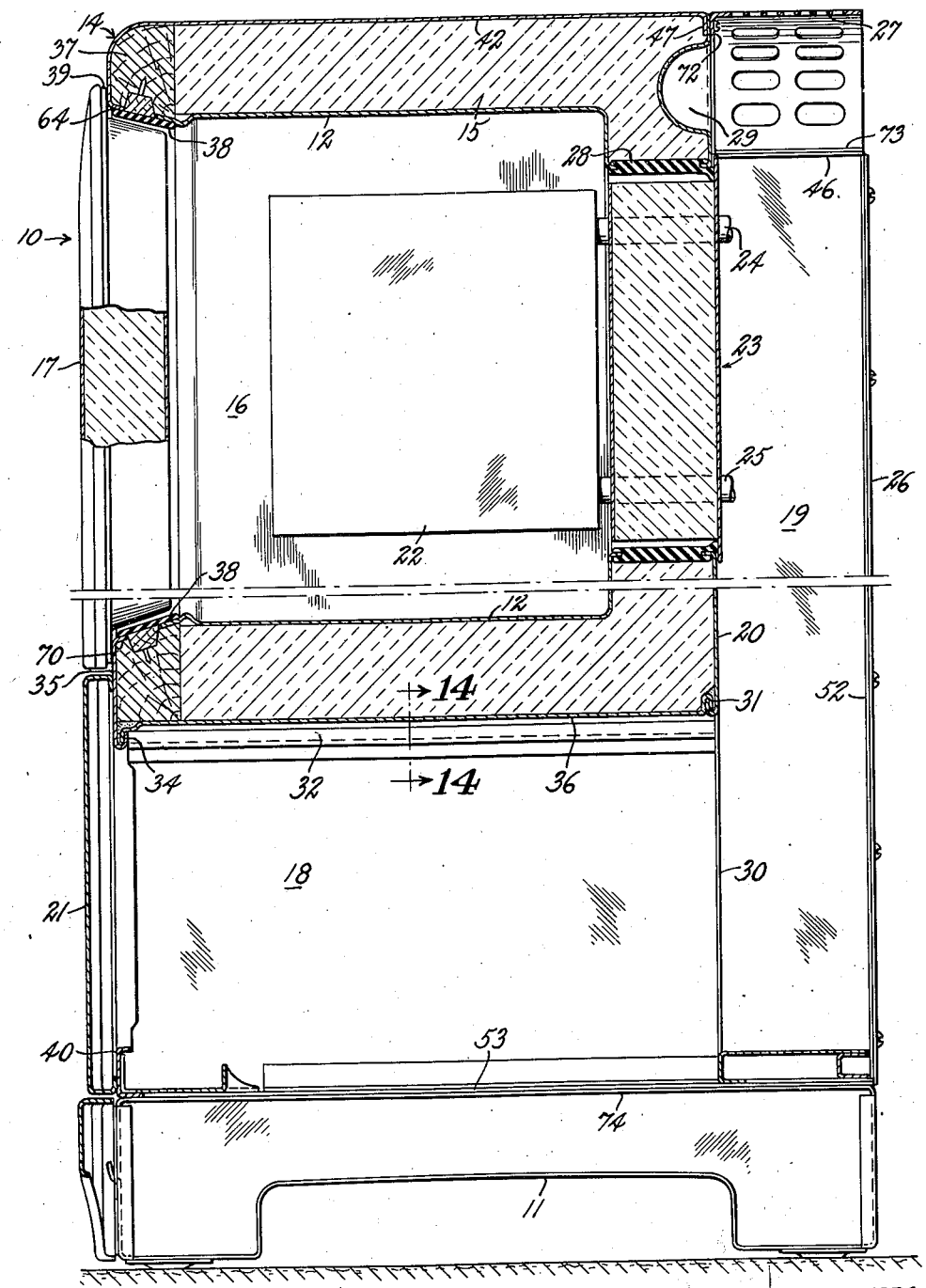
Figure 12:
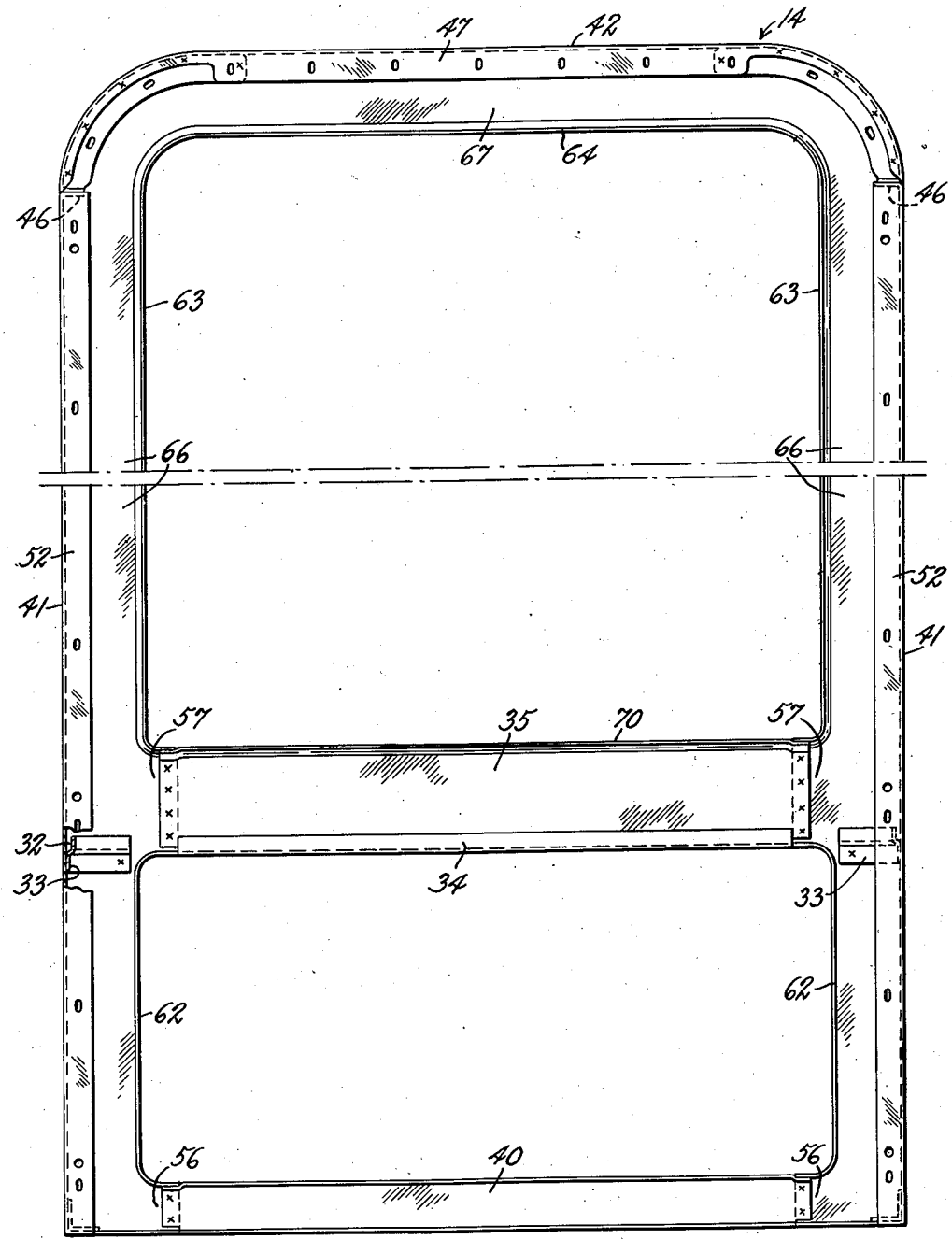

The above and other objects and advantages of the invention will be more fully understood from the following description taken in connection with the accompanying drawings forming a part of this specification, and of which Fig. 1 is a side vertical section of a refrigerator cabinet embodying the invention; Figs. 2, 3, and 4 are plan views of a metal sheet diagrammatically illustrating the steps in forming the outer one-piece shell of the refrigerator cabinet shown in Fig. 1; Figs. 5, 6, and 7 are end views of the metal sheet shown in Figs. 2, 3, and 4, respectively; Fig. 8 is a fragmentary sectional view taken at line 8—8 of Fig. 4 to illustrate more clearly the forming of the front of the cabinet; Fig. 9 is a front elevation of the outer shell formed from the sheet shown in Fig. 4; Fig. 10 is a sectional view taken at line 10—10 of Fig. 9 to illustrate more clearly the projecting tongues at the rounded upper corners of the outer shell; Fig. 11 is a view similar to Fig. 9 with the tongues bent over and secured to the top and side wall pieces to form part of the front of the cabinet; Fig. 12 is a rear elevation of the outer shell shown in Fig. 11 and also illustrates cross-members at the front of the cabinet; Figs. 13, 14, and 15 are sectional views illustrating the manner in which the bottom horizontal plate of the upper insulated storage space is supported and secured in position at the lateral side walls, front and rear of the cabinet, Fig. 14 being a view taken at line 14—14 of Fig. 1; Fig. 16 is a plan view of a metal sheet or blank, similar to that shown in Fig. 2, illustrating a modification of the invention; and Fig. 17 is a front elevation of the outer shell formed from the sheet shown in Fig. 16.

Referring to Fig. 1, the invention is shown in a refrigerator comprising a cabinet 10 provided with a base 11 and having an inner metal shell or liner 12 arranged within an outer metal shell 14 and insulated therefrom with any suitable insulating material 15. The inner shell 12 defines a thermally insulated storage compartment 16 having an opening, and at the opening a door 17 is hinged to the front of the cabinet. Below the storage compartment 16 is a lower compartment 18 which extends to the rear of the cabinet and communicates with an upward extending compartment 19 which is substantially the same height as the cabinet 10. The lateral side walls of the outer shell 14 extend or project beyond a metal plate or panel 20 of the rear insulated wall of the storage compartment 16 to provide the compartment 19, and at the opening of the lower compartment 18 a door 21 is hinged to the front of the cabinet.

A cooling element or evaporator 22 of a refrigerating system is disposed in the storage compartment 16 to maintain the latter at a desired low temperature. The refrigerating system, which may be either of an absorption or compression type, may be housed in the lower and vertical compartments 18 and 19. In order to arrange the cooling element 22 within the storage compartment 16, the rear wall of the storage compartment may be provided with an opening having a removable wall part or cover 23 through which extend conduits 24 and 25 connecting the cooling element 22 with other parts of the refrigerating system. The heat rejecting parts of the system are preferably housed in the vertical compartment 19 which forms a flue through which an upward flow of air is induced by natural draft. The vertically extending compartment 19 may be partly or fully enclosed by a rear plate 26. A perforated enclosure member 27 is fixed to the upper part of compartment 19 to permit upward flow of air in the latter. The parts of the refrigerating system associated with the cooling element 22 have not been shown in the drawings, since their illustration is not necessary for an understanding of the present invention.

The rear panel 20 serves as a closure member and extends between the lateral side walls of the outer shell 14. The upper part of panel 20 and rear wall of liner 12 are provided with flanged openings to receive the grooved edges of a trim 28 defining the opening for the removable cover 23. Above the opening for the removable cover 23 the panel 20 is provided with a recess or hollow 29 which extends between the side walls of the outer shell and may be used to house a part of the refrigerating system.

The lower part of panel 20 is provided with an enlarged opening 30 whereby the compartments 18 and 19 are in open communication. The upper edge of opening 30 is bent back upon itself to form a groove 31 which is substantially at the same height as grooves 32 formed by members 33 at the side walls of the outer shell, and groove 34 formed by the bent lower edge of cross-member 35 at the front of the cabinet, as shown most clearly in Figs. 12 to 15 inclusive. A bottom plate 36 having a flange about the periphery thereof is supported in the grooves formed by the upturned edges of the panel opening 30 and cross-member 35, and the members 33 disposed at the side walls of the outer shell. The periphery of bottom plate 36 is sealed to the rear panel 20, side walls of the outer shell 14, and cross-member 35 with a suitable material, such as the compound commercially known as Korite. The manner in which the bottom plate 36 is arranged and supported within the outer shell 14 is fully described and claimed in application Serial No. 135,628, of H. Wallace, filed April 8, 1937, now Patent No. 2,234,639, granted March 11, 1941.

The periphery of the rear panel 20 is sealed to the top and side walls of the outer shell 14, so that the thermally insulated walls of storage compartment 16 are effectively sealed against infiltration of air.

The edges of the outer shell 14 and inner shell 12 about the upper door opening are secured to a wooden frame 37. About the upper door opening are secured finishing or trim strips 38 which are preferably formed of insulating material, such as the material commercially known as Bakelite. The door 17 is provided with a ledge to which is fixed a gasket 39 which bears against the outer shell 14 and a cross-member 35 when the door is in its closed position. The lower door 21 in its closed position bears against the front marginal portions of the outer shell 14, cross-member 35, and a lower cross-member 40 which extends across the front of the cabinet.

In accordance with this invention the outer shell 14 is made of a single sheet of metal to form the top, front, and lateral side walls of the cabinet 10. Referring to Figs. 2 to 8 inclusive, the sheet of metal forming the outer shell 14 is blanked from a flat sheet and is of the general shape shown in Fig. 2. The sheet 14 comprises two end portions 41 forming the lateral side walls of the cabinet, and a central or intermediate portion 42 forming the top of the cabinet. The central portion 42 of sheet 14 is provided with a rectangular recess 43 along the rear longitudinal edge and is therefore narrower than the end portions 41.

The outer corners of recess 43 are notched at 44 and the inner corners thereof are slotted at 45, so that the edges of the sheet at the recess 43 can be bent to form the short transverse flanges 46 and a longitudinal flange 47, as indicated in Fig. 3. The extreme rear corners of sheet 14 are notched at 50, and the lateral edges adjacent the front corners are notched at 51 so that the rear longitudinal edges and the lateral edges of end portions 41 can be bent to form flanges 52, 53, and 54, as shown in Figs. 3 and 6. The edges of sheet 14 which are bent to form the flanges 46, 47, 52, 53 and 54 are provided with a plurality of spaced openings 55 when sheet 14 is blanked from a flat sheet.

The front longitudinal edge of the sheet is provided with rectangular projections or tabs 56 and 57. The projections 56 are at the extreme lateral edges of the sheet and the projections 57 are equally spaced from projections 56. The front longitudinal edge of sheet 14 is also provided with rectangular tongues 60 opposite the end portions of recess 43. The tongues 60 extend beyond the front longitudinal edge of the sheet and are concave-shaped at the outer edges. The tongues 60 are formed by cutting two pairs of notches 61 which are V-shaped with one side of each notch curved away from a straight side of one of the tongues 60.

The different portions along the front longitudinal edge of sheet 14 are also bent to form flanges, as indicated at 62, 63 and 64 in Fig. 3. The flanges 62 are right angle flanges, and the flanges 63 and 64 are inclined at an acute angle to the plane of the sheet 14.

After blanking the sheet 14 shown in Figs. 2 and 5 and described above, the longitudinal and lateral edges of the sheet are bent in suitable apparatus to form all of the flanges in a single operation. The sheet 14 after the flanging operation is of the general shape shown in Fig. 3 with all of the flanges being right angle flanges except the inclined flanges 63 and 64.

After the flanging operation the front longitudinal edge of the sheet is bent, as shown most clearly in Figs. 7 and 8, to form the front marginal portions of the cabinet. The front longitudinal edge is preferably bent to form a rounded corner 65. The curved contour begins at a region substantially at the apices of the V-shaped notches 61 so that sufficient material is provided to form the front marginal portions of the cabinet.

With the sheet 14 as shown in Figs. 4, 7 and 8, the metal members 33 are secured thereto, as by welding, for example, the forward ends of the members being curved and extending about the rounded corner formed at the front longitudinal edge of the sheet.

After the metal members 33 are secured in position, the sheet 14 shown in Fig. 4 is ready to be made into the shape of a U by forming over a rounded die. As shown in Figs. 9 and 10, the upper corners of the U-shaped shell are rounded with the bending taking place at the region of the tongues 60 and the end portions 49 of recess 43. The rounded front edge 65 of sheet 14 forms the side marginal portions 66 and top marginal portion 67 of the front of the shell. The tongues 60, which still project beyond the front of the shell after the latter is made U-shaped, are then bent over and united, as by welding, for example, to the side and top front marginal portions 66 and 67, as indicated at 68 in Fig. 11. It will be noted that after the outer shell 14 is completed, the inclined flanges 63 and 64 slant inward and rearward. The tongues 60 are bent in such a manner that the concave shaped outer edges thereof form the the flanges 69 so that a continuous inclined flange is provided from the upper side of one projection 57 around the entire upper opening to the upper side of the opposite projection 57.

The cross-members 35 and 40 at the front of the cabinet are secured in position after the outer shell is completed, and, as shown in Fig. 12, are provided with offset end portions which are welded to the under sides of projections 57 and 58. By providing the offset end portions, the outer surfaces of the cross-members 35 and 40 and projections or tabs 56 and 57 are substantially flush and provide a smooth surface. The cross-member 35 is provided with an inclined flange 70 which slants inward and also rearward, and, with the flanges 63 and 64, defines the opening of the upper compartment 16. The lower edge of cross-member 35 is bent back upon itself intermediate the offset end portions to provide the U-shaped groove 34 which, as previously explained, is at the same height as the grooves 32 formed by members 33 at the lateral side walls of the shell.

After the cross-members 35 and 40 are secured to the projections 56 and 57, the rear panel 20 is secured in position within the outer shell 14. The top edge of panel 20 is secured to flange 47 at the top of the shell, as shown most clearly in Fig. 1. The inner flange 72 of the perforated hood 27 is also secured to flange 47, and the bottom flanges 73 of the hood, which are located at the lateral sides of the cabinet, are secured to the short transverse flanges 46 which are at right angles to the flange 47. The rear wall 26 of the cabinet is secured to the vertically extending flanges 52 at the sides 41 of the outer shell 14. With the rear panel 20 secured in place, the bottom plate 36 is positioned within the outer shell, as described above, and the rear panel 20 and bottom plate 36 are sealed to prevent infiltration of air into the upper storage compartment 16.

The door frame 37, which is preferably in several parts or sections, is next positioned about the door opening of upper compartment 16. The flanges 63 and 64 of the outer shell 14, and the flange 70 of cross member 35, are secured to the frame, as by nails, for example, or in any other suitable manner. The insulating material 15 is then placed against the walls of the upper compartment, and inner liner 12 is inserted through the front of the cabinet with the trim 28 held in position between the flanged openings of the inner liner and rear panel 20. The front edges of liner 12 are secured to the door frame 37, as by nails, for example, and the trim or finishing strips 38 then secured in position. The base 11, having a flange 74 at its upper edge, is secured to the flanges 53 and 54 at the lower edges of the side walls 41 of the outer shell.

Instead of forming tongues 60 and notches or recesses 61 at each side of the tongues to provide smooth rounded corners at the front of the cabinet, a sheet of metal forming the outer shell may be blanked and provided with one or more recesses of any other suitable shape so that, upon bending, the edges of the recess or recesses at each corner are substantially in contact and form seams which can be readily united, as by welding, for example. In order to expedite the making of the one-piece outer shell having rounded corners, the shape of the sheet at the region of bending and also the shape of the notch or notches are preferably such that excess metal is avoided and clean cut seams are provided which can be immediately welded.

In Fig. 16 a modification of the sheet 14 illustrated in Fig. 2 is shown in which T-shaped notches 75 are provided opposite the ends of recess 43. The portions of notches 75 which extend in a lengthwise direction of the sheet are convex-shaped, while the portions of the slots extending toward the front longitudinal edge diverge at their outer ends. These notches are of such shape that, when the sheet is bent to provide the top and lateral side walls, as shown in Fig. 17, the edges of the notches are in abutting relation and can be welded or united in the same manner as the notches 61 in the embodiment described above.

By forming the outer shell of the cabinet from a single sheet of metal, an exceptionally rigid structure is provided in which the necessity of using gaskets at the top and lateral sides is avoided. The forming of rounded corners at the top and front of the cabinet is particularly desirable because relatively sharp corners are eliminated, and a cabinet is provided having a marked improvement in appearance. The notches are of such shape that smooth rounded surfaces are provided at the top front corners which conform to the contour of both the rounded corners at the top and front of the shell. After the cabinet shells have been rendered rustproof and finished, as with lacquer, for example, the entire outer surface presents a smooth appearance with no indication of the upper front corners having been formed by notching and subsequent welding of seams.

It is distinctly advantageous to provide inclined flanges 63 and 64 about the upper door-opening during the flanging operation. This provides a door opening which slants inward from the front to the rear and permits inserting the insulating material and liner through the front of the cabinet, thereby facilitating the assembly of the cabinet.

While several embodiments of the improved refrigerator cabinet structure have been shown and described, such variations and modifications are contemplated as fall within the true spirit and scope of the invention, as pointed out in the following claims.

What is claimed is:

1. An outer shell for a refrigerator cabinet having the top, lateral side walls and marginal front portions formed from a metal blank, said shell being substantially U-shaped and having rounded corners about the entire front and at the top thereof, said marginal front portions associated with said lateral side walls having inwardly extending tabs substantially opposite each other, the corners at the upper edges of said tabs and said marginal front portions being rounded, said marginal front portions and said tabs having flanges extending rearward therefrom, a cross member extending between and secured to said tabs, and said cross member also having a flange extending rearward therefrom and forming a continuation of said flange on said marginal front portions and said tabs.

2. An outer shell for a refrigerator cabinet including a top and two lateral sides made from a metallic blank, said shell having rounded corners at the juncture of the top and the lateral sides, the forward edges at the top and lateral sides being bent to form rounded corners and top and side front marginal portions extending from the rounded corners, the upper forward corners being rounded and including tongues welded to the top and side front marginal portions, the metallic blank being recessed or notched at each side of the tongues to separate each tongue from the forward edges at the top and lateral sides, and the tongues being brought into close edge to edge relation with the top and side front marginal portions to permit welding together of the edges after bending the tongues and forward edges at the top and lateral sides.

3. An outer shell for a refrigerator cabinet including a top and two lateral sides made from a metallic blank, said shell having rounded corners at the juncture of the top and the lateral sides, the forward edges at the top and lateral sides being bent to form rounded corners and top and side front marginal portions extending from such rounded corners, the edges of the top and side front marginal portions being bent to form flanges extending rearwardly from the front marginal portions, the upper forward corners being rounded and including tongues welded to the top and side front marginal portions and flanges formed integrally therewith, the metallic blank being recessed or notched at each side of the tongues to separate each tongue from the forward edges at the top and lateral sides, and the tongue being brought into close edge to edge relation with the top and side front marginal portions and integrally formed flanges to permit welding together of the edges after bending the tongues and forward edges of the blank to form the front marginal portions and the flanges, the tongues extending beyond the forward edge of the metallic blank and being of sufficient size to form rounded flanged corners connecting the flanges at the top and side front marginal portions.

ARTHUR C. SHUART.
HARRY L. AXFORD.